United States Patent

[15] 3,647,966
[45] Mar. 7, 1972

Teurnier

[54] APPARATUS FOR CONNECTING TRANSMISSION CHANNELS

[72] Inventor: Roger Teurnier, Rueil-Malmaison, France
[73] Assignee: C.I.T.-Compagnie Industrielle Des Telecommunication, Paris, France

[22] Filed: Jan. 19, 1970
[21] Appl. No.: 3,823

[30] Foreign Application Priority Data

Jan. 17, 1969 France ..................................6900829

[52] U.S. Cl. ..........................................................178/70 R
[51] Int. Cl. .........................................................H04l 25/52
[58] Field of Search ...............178/70 R, 2.3; 179/16.4, 170.2

[56] References Cited

UNITED STATES PATENTS

| | | | |
|---|---|---|---|
| 3,170,037 | 2/1965 | Carver et al. | 178/70 R |
| 3,384,711 | 5/1968 | Boxall | 178/70 R |
| 2,694,749 | 11/1954 | Hardy | 179/170.2 |

*Primary Examiner*—Kathleen H. Claffy
*Assistant Examiner*—William A. Helvestine
*Attorney*—Craig, Antonelli and Hill

[57] ABSTRACT

Apparatus for connecting telegraph channels by control from a central control member having access to respective sections to be connected, including a transmitter and a receiver connected in series between the two sections of the channel and the central control member being connected to the receiver to selectively inhibit the output thereof.

7 Claims, 5 Drawing Figures

APPARATUS FOR CONNECTING TRANSMISSION CHANNELS

The present invention relates to an apparatus for the connection of transmission channels, which is formed entirely of semiconductors, and by means of which it is possible to make or break, as desired, a connection between two sections of one transmission channel, notably a telegraph channel, under the control of a controlling member which itself has access to both of the sections.

The apparatus according to the invention may be employed generally in telegraph switching and notably for forming connecting circuits employed in automatic telegraph switching equipment.

It is known that the connecting circuit is the member which makes or breaks the connection in a telegraphic communication between the calling and called subscribers. The connection is made under the control of a centralized member, often called a register, when the two correspondents are present; it is broken when one of the correspondents terminates the call and the terminating signal is emitted, so that a supervisory circuit situated in the connecting circuit detects the said signal and brings about the clearing of the chain of members engaged in the central station between the calling and called subscribers.

During the phase for the preparation of the call, the register is connected either to the caller or to the called subscriber, the two correspondents not yet being connected. However, some information must pass from one correspondent to the other and the necessary switching actions take place in the register. When all the prior conditions are established, the register brings about the establishment of the connection, in the connecting circuit, between the two subscribers and ceases operation.

In the known connecting circuits, the connection is generally established by contacts of an electromagnetic relay controlled by the register, i.e., the connecting circuit is broken in the state of rest.

The apparatus according to the invention proceeds in the inverse manner, i.e., the connecting circuit is normally closed in the state of rest; the connecting circuit can be broken on command, for example throughout the phase for the preparation of the communication.

The apparatus according to the invention is distinguished notably by the fact that the transmission channel is divided into two sections and the connecting device comprises a receiver and a transmitter in series, which are connected respectively to each of the two sections of the channel, the two sections being independently fed on either side of the connecting apparatus and means being provided to make or break the connection between the two sections of the channel.

In accordance with one feature of the invention, in a circuit comprising two telegraph channels, the connecting device consists of a transmitter and of a receiver in series with each of the two telegraph channels, an individual inhibitory control enabling each of the two receivers to produce or not to produce at the output the signals received at the input.

In accordance with a further feature of the invention, the connection to each telegraph channel between the receiver and the transmitter is preferably effected in single-current or return-to-zero form, although a double-current or bipolar connection may also be effected in accordance with the same principle.

In accordance with a further feature of the invention, each telegraph channel of the line is divided into two sections, of which the receiving-end section, either at the calling subscriber's end or at the called subscriber's end comprises successively, as terminal elements, the receiver and the transmitter.

In accordance with a further feature of the invention, the connecting device constitutes a section-to-section repeater for each of the two telegraph channels of the line; at the calling subscriber's end, the receiving channel is fed, for example, by the subscriber end of the teleprinter unit and the transmission towards the called subscriber is fed by the associated transmitter of the connecting device; at the called subscriber's end, the arrangement is exactly symmetrical.

One advantage of the apparatus according to the invention resides in the possibility of doubling the line resistance and consequently its length, each telegraph channel between the calling subscriber and the called subscriber being divided into two separately fed sections.

Another advantage of the apparatus according to the invention resides in the sensitivity of the electronic circuits employed, which permit a line current of lower than normal strength between the calling subscriber and the connecting apparatus without the called subscriber thereby being affected, the feeds being independent on either side of the connecting device.

Another advantage of the apparatus according to the invention is that it facilitates communications in transit through a number of automatic switching equipments for the same reason as that just given, namely the independence of the feeds of the various sections constituting a telegraph channel between the calling and called subscribers.

On the other hand, it is known that there exists in all connecting circuits employed in telegraphy a supervisory device which has the object of detecting the end of the call. The known supervisory devices are generally inserted in series in the lines and, although their resistance is low, they nevertheless constitute attenuating elements, the effect of which becomes sufficient in the case of calls in transit to necessitate repeater arrangements.

Another advantage of the apparatus according to the invention is that it avoids the necessity for the said specially designed repeater arrangements, the regeneration of the signals taking place automatically by the use of the connecting apparatus according to the invention.

In accordance with the invention, there may be employed notably as transmitter and receiver devices the devices described respectively in the French Pat. application filed by the applicants on the 23rd of Dec., 1968 under No. PV 180,133, for "Electronic device for the retransmission of modulation, notably of telegraph modulation" and French Pat. No. 1,490,647 filed on the 21st of June, 1966, with modifications which will be referred to in the course of the following description for the purpose of adapting them for operation as connecting circuits; however, other devices may also be employed without departing from the scope of the invention.

Further features and advantages of the invention will become apparent from the following detailed description of one embodiment and from the corresponding drawings, in which.

Figure 1:
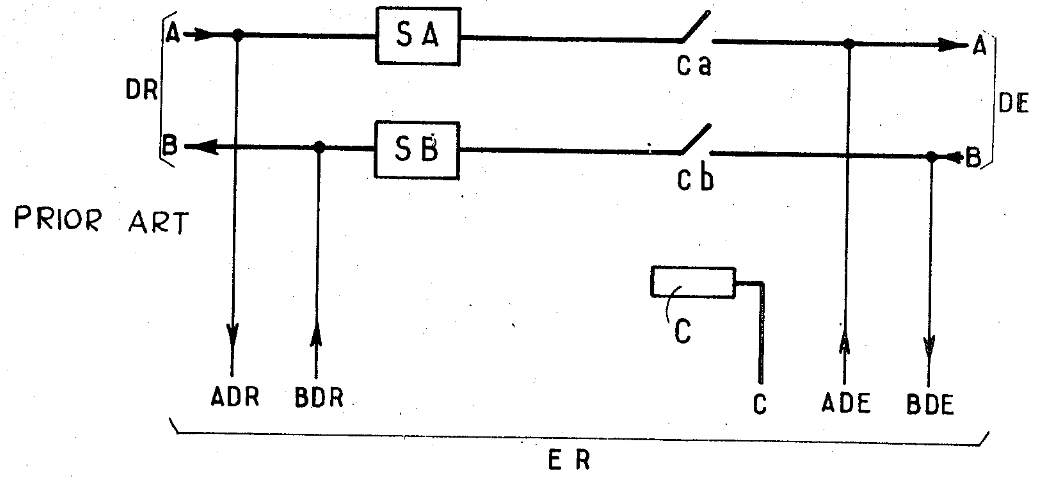
FIG. 1 shows a telegraph connecting circuit arrangement of known type.

In the connecting circuit of known type as illustrated in FIG. 1, the line wires A and B are connected to the calling subscriber (end DR) through the preselecting devices and are connected to the called subscriber (end DE) through the selecting devices. The wire A at the end DR receives the modulation coming from the caller, either directly or through one or more transit central stations, this modulation being transmitted along the same wire A to the called subscriber. The wire B at the end DE likewise receives the modulation coming from the called subscriber, either directly or through one or more transit central stations, this modulation being transmitted along the same wire B to the calling subscriber. The supervisory devices SA and SB are inserted in series in the line and observe the exchanged modulation; they bring about the clearing of the networks of preselection and selection devices after having detected the terminating signal emitted by one of the correspondents.

The line wires A and B are normally broken by the contacts *ca* and *cb* of a relay C; after the phase for the preparation of the call and when all the prerequisites have been satisfied, the register actuates the relay C through the wire *c*; the direct connection between the correspondents is then established and the call commences. It will be observed that the line wires A and B are connected to branches ADR and BDR situated at the calling subscriber's end, before the break consisting of the contacts *ca* and *cb*, and to branches ADE and BDE at the called subscriber's end after the break consisting of the contacts *ca* and *cb*. All these branches are connected to a register ER, which may thus be connected with the calling subscriber alone or with the called subscriber alone. The register can thus pass certain prior information in only one direction without the calling and called subscribers being directly connected.

Figure 2:
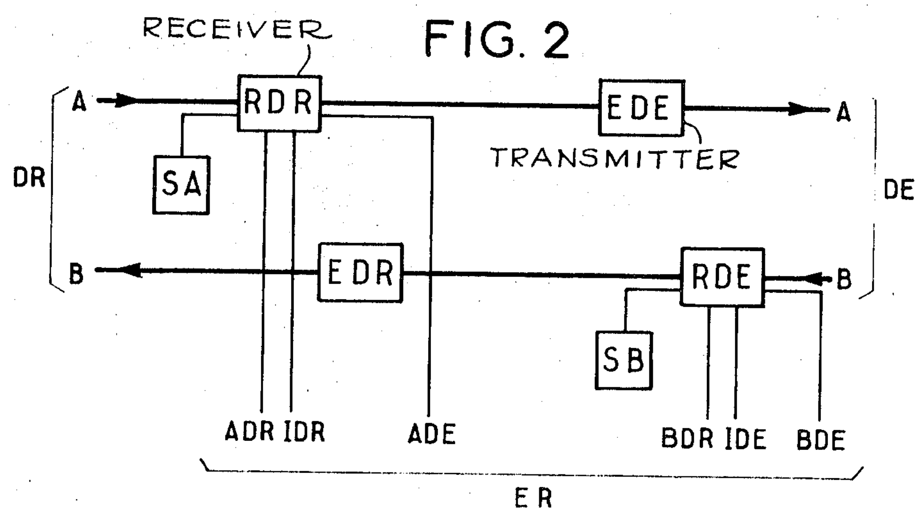
FIG. 2 is a general diagram of a connecting device according to the invention.

In FIG. 2, which illustrates a connecting apparatus according to the invention employed as a connecting circuit, there will be seen connected along the wire A, successively, at the calling subscriber's end DR a receiver RDR, which by way of example may be that forming the subject of French Pat. application No. PV 180,133, filed on the 23rd of Dec., 1968 by the applicants, for "Electronic Device for Retransmitting Modulation, Notably Telegraph Modulation," and the transmitter EDE, which by way of example may be that forming the subject of French Pat. No. 1.490,647 already referred to. These devices are slightly modified and will hereinafter be briefly described, with reference to FIGS. 3 and 4 respectively. Likewise, there will be found along the wire B, successively, at the called subscriber's end DE a receiver RDE and a transmitter EDR. The receiver devices RDR and RDE are absolutely identical and the transmitter devices EDR and EDE are also absolutely identical. The devices SA and SB are supervisory devices which may be, for example, those described by the applicants in their French Pat. application PV 183,136 , filed on the 31st of Dec., 1968, for "Electronic Device Notably for a Supervisory Telegraph Circuit."

Branches extend from the calling receiver RDR towards the register: the wire ADR permits reception of the signals emanating from the calling subscriber along the wire A: the inhibitory wire IDR, under the control of the register, prevents these signals from being retransmitted towards the called subscriber; the wire ADE enables the register to transmit only to the called subscriber the signals which it desires to transmit only in this direction. Other branches extend towards the register from the called receiver RDE: the wire BDE permits the reception of the signals arriving from the called subscriber along the wire B: the inhibitory wire IDE, under the control of the register, prevents these signals from being retransmitted to the calling subscriber; the wire BDR enables the register to transmit only to the calling subscriber the signals which it desires to transmit in this direction only. These various branches extending towards the register are obviously established only in the preparatory period of the call; during the call itself, these branches are broken, since the register can then be seized for preparing other calls.

Figure 3:
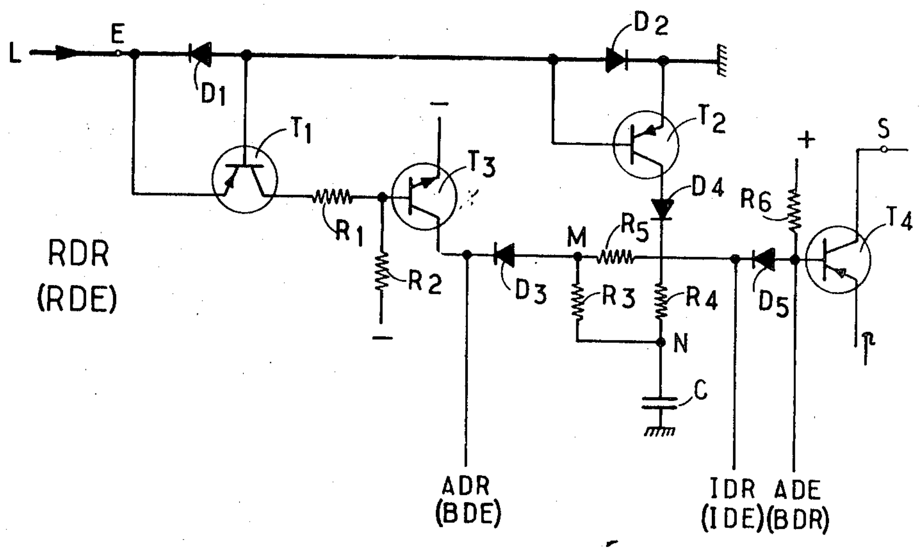
FIG. 3 illustrates by way of example a receiver.

FIG. 3 illustrates the receiver RDR or the receiver RDE as employed, for example, in the connecting circuit according to the invention (FIG. 2). These receivers are of the type described in applicants' French Pat. application No. PV 180,133 of the 23rd of Dec., 1968.

These receivers comprise in series along the line L a diode D1 and a diode D2, that end of the line which is further from the input E being connected to earth. The diodes D1 and D2 are oriented in opposite direction, the diode D1 having its cathode directed towards the input and the diode D2 having its cathode connected to earth. The input E of the line is also connected to the emitter of a transistor T1, the base of which is connected to the anode of diode D1, the cathode of the diode D2 also being connected to the emitter of a transistor T2 whose base is connected to the anode of diode D2; the bases of the transistors T1 and T2, at a common point along the line, are therefore at the same potential. The transistors T1 and T2 are of PNP-type. The collector of the transistor T1 is connected to the base of a transistor T3 of NPN-type, through a resistor R1, and the base of the transistor T3 is also connected to negative polarity through a resistor R2. The emitter of the transistor T3 is directly connected to negative polarity and the collector of the transistor T3 is connected through a diode D3 to a common point M; there extend from the latter point M two circuit branches, the first of which consists of a resistor R3 whose end N is connected to one side of a capacitor C, the other side of which is earthed; the second branch connects the point M to the base of a transistor T4 of PNP-type through a resistor R5, the base of the transistor T4 also being connected to earth through a resistor R6. The collector of the transistor T2 is connected to the point N through a diode D4 and a resistor R4. Finally, the emitter of the transistor T4 is connected to a slightly negative bias voltage p, its collector being directly connected to the output S.

However, as compared with the aforesaid French Patent Application, the following modifications have been introduced: a diode D5 has been inserted between the resistor R5 and the base of the transistor T4; a branch ADR (or BDE) extending towards the register has been taken from the collector of the transistor T3; another branch IDR (or IDE) extending towards the register has been taken from the common point between the resistor R5 and the cathode of the diode D5; finally, a third branch ADE (or BDR) extending towards the register has been taken from the base of the transistor T4.

The operation of this receiver will be recalled in the following: it will be assumed that a modulation arriving at E along the telegraph channel L is, for example, a negative element. The diode D1 is conductive and the transistor T1 is nonconductive, its emitter and its base being substantially at the same potential; the transistor T3 remains nonconductive for the same reason. On the other hand, the diode D2 being forwardly oriented is not conductive and it follows that the earth potential of the emitter of the transistor T2 is higher than the negative potential of the base. The transistor T2 is therefore conductive and the capacitor C discharges through T2, D4 and R4. The positive polarity of the emitter of T2 is applied through T2, D4, R4, R3 and R5 to the cathode of the diode D5, which it renders nonconductive, but this same polarity is also applied to the wire ADR through the diode D3.

Therefore, during the reception of a negative element, earth is applied through the resistors to the wires ADR and IDR and earth is also applied through R6 to the wire ADE. T1, T3 and T4 are nonconductive. T2 is conductive; no polarity is applied to the output S of the device. It will now be assumed that a positive element arrives at E; the diode D1 is forwardly oriented, and a weak inverse current passes through it. The emitter of T1, at the positive telegraph polarity, is at a higher potential than the base: T1 becomes conductive and supplies a current through R1 and R2. The potential of the base of T3 becoming higher than that of its emitter, the transistor T3 is conductive. The negative polarity is applied to the wire ADR and a circuit is closed through D3, R5, D5 and R6. Since the potential of the base of T4 is lower than that of its emitter (p close to earth), the transistor T4 is conductive. The transistor T2 is nonconductive, the diode D2 being conductive, and T2 is nonconductive.

Therefore, during the reception of a positive element the complete negative polarity is present at the wire ADR and a negative potential is present at the wires IDR and ADE. The transistors T1, T3 and T4 are conductive, and T2 is nonconductive. The potential p close to earth is applied to the output S of the device.

The register is connected to the receiver RDR by the wires ADR, IDR and ADE for the cannel A; it is connected to the receiver RDE by the wires BDE, IDE and BDR for the channel B. If the register wishes to break the connection between the receiver RDR and the emitter EDE it is sufficient for it to apply a positive polarity to the inhibitory wire IDR, whereby the diode D5 is rendered nonconductive. The register receives the signals from the calling subscriber through the wire ADR and transmits the signals to the called subscriber by applying a negative polarity to the wire ADE, but the direct connection between the calling subscriber and the called subscriber is only established when the positive inhibitory polarity is suppressed at the wire IDR.

Figure 4:
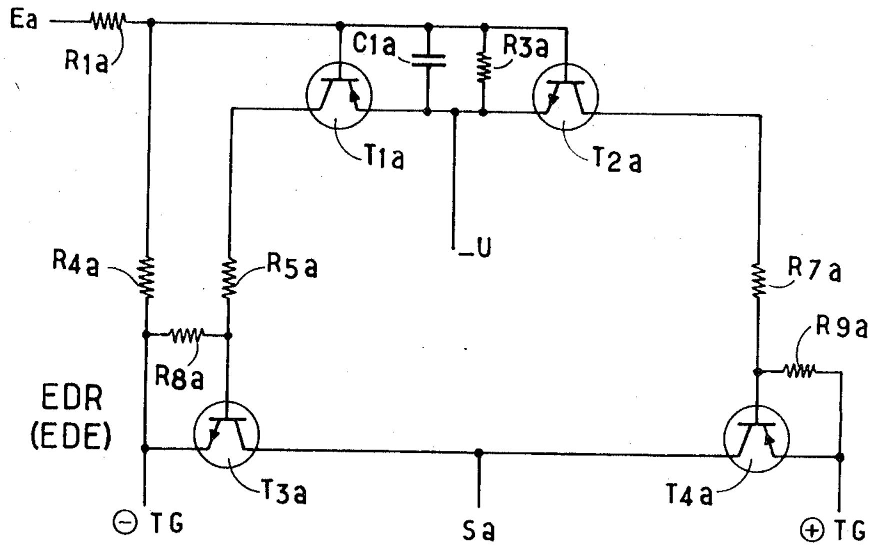
FIG. 4 illustrates by way of example a transmitter.

FIG. 4 illustrates the transmitter EDR or the transmitter EDE as employed, for example, in the connecting circuit according to the invention (FIG. 2). These transmitters are of the type described in French Pat. No. 1,490,647 of the 21st of June, 1966.

The said transmitters comprise two transistors T1*a* and T2*a*, the bases of which are connected at a common point through a resistor R1*a* to the input E*a*. These bases are also connected to a capacitor C1*a* and to resistors R3*a* and R4*a*. The emitters of the transistors T1*a* and T2*a* are connected together and the common point thus formed is in turn connected to the other electrode of the capacitor C1*a*, to the other end of the resistor R3*a* and to a negative polarity -U of a current source; the collector of the transistor T1*a* is connected to the base of a transistor T3*a* through a resistor R5*a* and the collector of the transistor T2*a* is connected to the base of a transistor T4*a* through a resistor R7*a*. The base of the transistor T3*a* is also connected to the end of a resistor R8*a*, the other end of which is connected to the negative telegraph polarity. This terminal is also connected to the other end of the resistor R4*a* and to the emitter of the transistor T3*a*. The collector of the transistor T3*a* is connected to the collector of the transistor T4*a* and the common point thus formed is connected to the output terminal S*a*. The emitter of the transistor T4*a* is connected to its base through a resistor R9*a* and to the positive telegraph polarity. In the embodiment referred to here, the transistors T1*a* and T2*a* are of opposite types, T1*a* being of PNP-type and T2*a* of NPN-type, while the transistor T3*a* is of NPN-type and the transistor T4*a* is of PNP-type.

However, as compared with the aforesaid patent, the following modifications have been introduced; the wire b, the resistors R2, R6 and the transistor TR4 have been omitted. The signals are introduced at Ea and led out at S*a*. In accordance with FIG. 2, the output S of the receiver device according to FIG. 3 is connected to the input Ea of the transmitter device according to FIG. 4; in accordance with the operation of the receiver, as previously seen, there can only be found at the input Ea an earth potential which is applied by the transistor T4 of the receiver if the latter has received a positive element, or only a negative potential applied by the transmitter itself in accordance with FIG. 4 if the receiver has received a negative element, the transistor T4 of the receiver than being nonconductive.

The operation of the transmitter will now be recalled in the following. It will first be assumed that an earth polarity is applied to E*a*. This circuit closes through the resistor R1*a*, and on the one hand is connected to the polarity —U through the resistor R3*a* and on the other hand to the telegraph polarity —TG through the resistor R4*a*. The PNP-type transistor T1*a* remains nonconductive, its base being at a higher potential than the emitter. The NPN-type transistor T2*a* is conductive, its base being at a higher potential than its emitter; the transistor T3*a* remains nonconductive, its base and its emitter remaining at the same potential —TG. Since the transistor T2*a* has become conductive, a circuit is closed through —U, T2*a*, R7*a*, R9*a* and +TG. The potential of the base of the transistor T4*a* is more negative than its emitter, since the resistor R9*a* produces an additional voltage drop. The transistor T4*a* is therefore conductive and the positive polarity —TG of the telegraph battery appears at the output S*a* of the transmitter.

It will now be assumed that no polarity is applied to E*a* by the receiver and that the negative potential —U is lower, in absolute value, than the negative telegraph polarity —TG. Under these conditions, the PNP-type transistor T1*a* becomes conductive, its base being at a more negative potential than its emitter, and the NPN-type transistor T2*a* becomes nonconductive for the same reason. The transistor T4*a* becomes nonconductive (the same polarity +TG at its emitter and at its base) and the positive polarity +TG disappears from the output S*a*. In parallel therewith, since the transistor T1*a* has become conductive, the base of the NPN-type transistor T3*a* acquires a higher potential than its emitter. The transistor T3*a* becomes conductive and applies the negative telegraph polarity to the output S Therefore, to sum up:

On reception of a negative element by the receiving device, the receiver does not apply any potential to its own output S, but transmitting device then applies the negative telegraph polarity to its output S*a*.

On reception of a positive element by the receiving device, the receiver applies a potential close to earth to its output S, but the transmitting device then applies the positive telegraph polarity to its output S*a*.

Thus, the connection made with single current between the receiver and the transmitter produces a translation of the signals from the transmitter.

Figure 5:
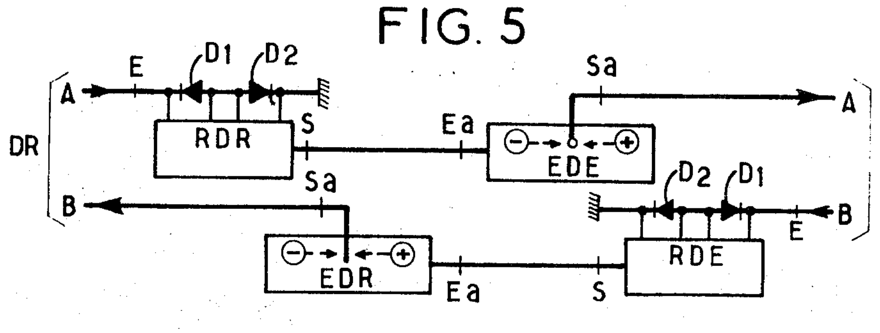
FIG. 5 is a diagram of a connecting apparatus according to the invention, showing the principle of the repeaters between the two sections of the telegraph channels.

The division of the line into two sections by means of the connecting circuit according to the invention will be more readily understood from FIG. 5. It will be assumed that there are provided in the telegraph wire A the receiver RDR and the transmitter EDE previously described by way of example, and that there are provided in the wire B the receiver RDE and the transmitter EDR identical to RDR and to EDE respectively. The calling subscriber's end is indicated by DR and the called subscriber's end is indicated by DE. There will be seen in the wire A extending from the caller through the preselection apparatus the diodes D1 and D2 illustrated in the diagram of FIG. 3; E indicates the input of the receiver RDR (FIG. 3) and S is its output. The output S is metallically connected to the input E*a* of the transmitter EDE (FIG. 4), of which S*a* is the output. The extended output S*a* constitutes the wire A which, through the selection apparatus and the line, is connected with the called subscriber DE. The same arrangement, but disposed symmetrically, is to be found in the wire B. It is to be noted that the channel A may be divided into two sections, the first of which is formed by the line wire A, of which the receiver RDR and the emitter EDE constitute the terminal elements; the second section is formed from the output S*a* and by the wire A extended towards the called subscriber. The output S*a* is adapted to receive the negative polarity or the positive polarity of the telegraph battery (chain-lined), depending upon whether a negative signal or a positive signal has been received at the input E of RDR. However, as has been seen in the description of FIGS. 3 and 4, there is no metallic continuity between the wire A (end DR) and the wire A (end DE): it is a question of a repeater action, the first section being supplied from the calling subscriber and the second section being supplied from the connecting circuit according to the invention. The two sections are situated symmetrically on the channel B between the called subscriber and the calling subscriber. The connections normally established between the two sections of the channel A and the two sections of the channel B are broken only when the register applies inhibitory polarities to the wires IDR or IDE (see FIGS. 2 and 3).

The invention covers more particularly the production of a telegraph connection circuit by the use of a receiver and a transmitter in series along each channel, the interruption necessary during the preparation for the call between the calling subscriber's end and the called subscriber's end being obtained from the register through an inhibiting wire which, however, enables the register to be separately connected in receiving relationship with the calling subscriber by the wire ADR or in transmitting relationship with the called subscriber by the wire ADE or symmetrically by the wires BDE and BDR along the channel B. The receivers and transmitters illustrated in FIGS. 3 and 4 are preferably employed, but are referred to by way of example and transmitters and receivers of other constructions could be employed without departing from the scope of the invention.

Of course, the invention is in no way limited to the embodiment described and illustrated, which has been referred to only by way of example. More particularly, certain arrangements could be modified and certain means could be replaced by equivalent means without departing from the scope of the invention.

I claim:

1. Apparatus for connecting transmission channels, for telegraphy switching, particularly for automatic telegraph switching equipment, characterized in that a transmission channel is divided into two sections, said apparatus comprising a receiver and a transmitter connected in series between the respective sections of each channel, the two sections independently receiving and transmitting signals on either side of the connecting apparatus, and means for selectively making and breaking the connection between said two sections of each channel, wherein said receiver and transmitter are formed of semiconductor elements and wherein said apparatus further includes a central control means having access to both of said sections for selectively actuating said means for making and breaking the connection between said two sections of each channel, wherein two transmission channels are provided, a transmitter and a receiver being provided in series in each of the two channels, said central control means includes individual inhibitory control means for enabling each of the two receivers to selectively produce at the output thereof modified forms of the signals received at the input thereof, wherein said transmission channels are situated between a calling subscriber and a called subscriber and each includes a line wire, each line wire including a receiver and a transmitter in series, the transmitter being switchably coupled to the respective polarities of the telegraph battery, each line being divided into two sections by said making and breaking means and means being provided to enable each section to communicate separately with said central control means, the modulation received on one of the sections being retransmitted on the other, but each of the two sections separately receiving and transmitting signals, one from the transmitting subscriber and the other from the transmitter of the connecting apparatus, so that said transmitter of the connecting apparatus, which constitutes at the same time a repeater between the two sections, enables each section to have a greater length without reduction of the usually accepted line current.

2. Apparatus according to claim 1, wherein said receiver for the signals arriving in the channel comprises a common point for the detection of positive and negative signals, the said common point being connected through a resistor and a first diode in series to the base of an output transistor of the receiver and also through a second diode to an input of said central control means, the first diode having its cathode connected to said resistor and its anode connected to the base of said output transistor, the cathode of said first diode being connected by an inhibitory wire to said central control means, the anode of said first diode being connected on the one hand to one polarity voltage through a resistor and on the other hand to an output wire of said central control means so that said central control means, by applying a polarity of appropriate direction to said first diode through said inhibitory wire renders the said first diode nonconductive and thus separates the reception of the signals received along the channel from the transmission of the signals by said central control member to said output transistor, and so that when said central control member does not apply any inhibitory polarity to said first diode, the signals received along the line at said common point are directly transmitted through said resistor and said first diode to the base of said output transistor.

3. Apparatus according to claim 2, wherein signals are received in bipolar form by said receiver and are transmitted to said transmitter by said output transistor of the receiver in return-to-zero form, the collector of the output transistor being connected to the input of the transmitter which is switchably coupled to the positive and negative polarity voltages from the telegraph battery, said receiver including means for applying to the collector of the output transistor thereof on reception of a positive signal a certain potential which produces in the transmitter the emission of the positive telegraph polarity, on reception of a negative signal by the receiver the output transistor of the receiver providing no potential to its collector, this state producing in the transmitter the emission of the negative telegraph polarity.

4. Apparatus according to claim 3, wherein, in the channel emanating from the calling subscriber, are connected two diodes connected to the input of the receiver, the output of the receiver being connected to the input of the transmitter, the output of which constituting the channel in communication with the called subscriber, the same arrangement, disposed symmetrically, being present in each transmission channel, the channels being divided into two sections without metallic continuity, the first of which sections is formed by a first wire of which the receiver and the transmitter constitute the terminal elements, and the second section being formed of the output and said first wire extended towards the called subscriber.

5. Apparatus for connecting transmission channels, for telegraph switching, particularly for automatic telegraph switching equipment, characterized in that a transmission channel is divided into two sections, said apparatus comprising a receiver and a transmitter connected in series between the respective sections of each channel, the two sections independently receiving and transmitting signals, on either side of the connecting apparatus, and means for selectively making and breaking the connection between said two sections of the channel, wherein said making and breaking means includes a central control means for selectively applying control signals to said receiver effective to inhibit the output thereof, wherein said transmission channel is formed by a communication line, said two sections being formed by a calling subscriber end of said line connected to the input of the receiver and a called subscriber end of said line connected to the output of the transmitter and, wherein said receiver for the signals arriving in the channel comprises a common point for the detection of positive and negative signals, the said common point being connected through a resistor and a first diode in series to the base of an output transistor of the receiver and also through a second diode to an input of said central control means, the first diode having its cathode connected to said resistor and its anode connected to the base of said output transistor, the cathode of said first diode being connected by an inhibitory wire to said central control means, the anode of said first diode being connected on the one hand to one polarity voltage through a resistor and on the other hand to an output wire of said central control means so that said central control means, by applying a polarity voltage of appropriate direction to said first diode through said inhibitory wire renders the said first diode nonconductive and thus separates the reception of the signals received along the channel from the transmission of the signals by said central control member to said output transistor, and so that when said central control member does not apply any inhibitory polarity to said first diode, the signals received along the line at said common point are directly transmitted through said resistor and said first diode to the base of said output transistor.

6. Apparatus according to claim 5, wherein signals are received in bipolar form by said receiver and are transmitted to said transmitter by said output transistor of the receiver in return-to-zero form, the collector of the output transistor being connected to the input of the transmitter, which is switchably connected to the positive and negative polarity voltages from the telegraph battery, said receiver including means for applying to the collector of the output transistor thereof on reception of a positive signal a certain potential which produces in the transmitter the emission of the positive telegraph polarity, on reception of a negative signal by the receiver the output transistor of the receiver providing no potential to its collector, this state producing in the transmitter the emission of the negative telegraph polarity.

7. Apparatus according to claim 6, wherein, in the channel emanating from the calling subscriber, are connected two diodes connected to the input of the receiver, the output of the receiver being connected to the input of the transmitter.

* * * * *